United States Patent
Ray et al.

(10) Patent No.: US 10,673,607 B2
(45) Date of Patent: *Jun. 2, 2020

(54) CLOCK SYNCHRONIZATION

(71) Applicant: Diebold Nixdorf, Incorporated, North Canton, OH (US)

(72) Inventors: Gregory S. Ray, North Canton, OH (US); Kenneth Varn, Canton, OH (US); David R. McCortney, North Canton, OH (US)

(73) Assignee: Diebold Nlxdorf, Incorporated, North Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/135,467

(22) Filed: Sep. 19, 2018

(65) Prior Publication Data

US 2019/0020464 A1    Jan. 17, 2019

Related U.S. Application Data

(63) Continuation of application No. 14/959,955, filed on Dec. 4, 2015, now Pat. No. 10,110,368.

(60) Provisional application No. 62/089,055, filed on Dec. 8, 2014.

(51) Int. Cl.
| | |
|---|---|
| *H04L 7/00* | (2006.01) |
| *H04L 29/06* | (2006.01) |
| *H04J 3/06* | (2006.01) |
| *G09C 1/00* | (2006.01) |
| *H04L 9/32* | (2006.01) |
| *G06F 1/14* | (2006.01) |
| *G06F 21/31* | (2013.01) |
| *G06F 1/12* | (2006.01) |

(52) U.S. Cl.
CPC .............. *H04L 7/0012* (2013.01); *G06F 1/12* (2013.01); *G06F 1/14* (2013.01); *G06F 21/31* (2013.01); *G09C 1/00* (2013.01); *H04J 3/0635* (2013.01); *H04J 3/0685* (2013.01); *H04L 9/3226* (2013.01); *H04L 9/3234* (2013.01); *H04L 63/083* (2013.01)

(58) Field of Classification Search
CPC . H04L 7/00–0029; H04L 7/0337; H04L 9/32; H04L 9/3226–3228; H04L 63/083–0853; H04J 3/0635–0667; H04J 3/0685–0697; G06F 1/04–14; G06F 21/31–35
See application file for complete search history.

(56) References Cited

U.S. PATENT DOCUMENTS

| | | | | |
|---|---|---|---|---|
| 5,805,704 A | * | 9/1998 | Hsu | ........................ H04H 20/91 705/52 |
| 2005/0152213 A1 | * | 7/2005 | Akiyama | ................... G06F 1/14 365/207 |
| 2006/0156011 A1 | * | 7/2006 | Masui | ................. H04L 63/1466 713/178 |

(Continued)

*Primary Examiner* — Brendan Y Higa
(74) *Attorney, Agent, or Firm* — Black, McCuskey, Souers & Arbaugh, LPA (57) ABSTRACT

In an example embodiment disclosed herein, a first clock is allowed to synchronize with a second clock as long as the time difference between the first and second clocks is less than a predefined limit. If the time difference between the clocks is not less than the predefined limit, the first clock does not synchronize with the second clock until a predefined activity has occurred.

20 Claims, 5 Drawing Sheets

(56) References Cited

U.S. PATENT DOCUMENTS

| | | | |
|---|---|---|---|
| 2009/0235333 A1* | 9/2009 | Ong | G06F 21/85 726/4 |
| 2010/0117850 A1* | 5/2010 | McCaslin | G08B 5/36 340/815.4 |
| 2016/0269168 A1* | 9/2016 | Carstens | A47G 29/141 |

* cited by examiner

CLOCK SYNCHRONIZATION

CROSS REFERENCE TO RELATED APPLICATIONS

This application is a continuation of U.S. application Ser. No. 14/959,955 filed on Dec. 4, 2015, now U.S. Pat. No. 10,110,368, that claims the benefit under 35 U.S.C. § 119 of U.S. Provisional Application No. 62/089,055 filed Dec. 8, 2014.

TECHNICAL FIELD

The present disclosure relates generally to computer systems and more specifically to synchronizing clocks between computer systems.

BACKGROUND

Clock synchronization is a technique used so that multiple devices are on a common time frame. One clock, e.g. a master clock, may send a signal to another clock indicating its present time, allowing the other clock to synchronize with the master clock.

BRIEF DESCRIPTION OF THE DRAWINGS

The accompanying drawings incorporated herein and forming a part of the specification illustrate the example embodiments.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein, a technique where a first clock is allowed to synchronize with a second clock as long as the time difference between the first and second clocks is less than a predefined limit. If the time difference between the clocks is not less than the predefined limit, the first clock does not synchronize with the second clock until a predefined activity has occurred.

Description of Example Embodiments

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Figure 1:
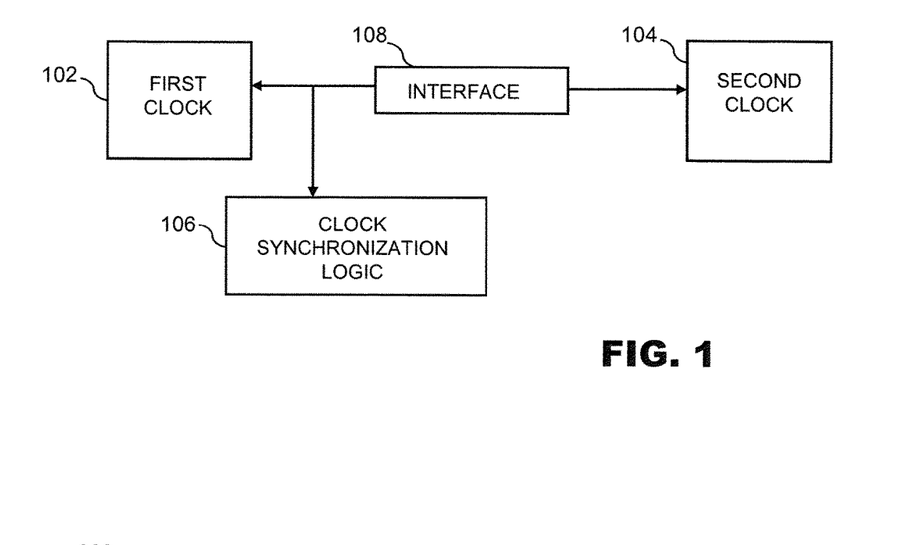
FIG. 1 is a block diagram illustrating an example of clock synchronization in accordance with an example embodiment.

FIG. 1 is a block diagram illustrating an example of clock synchronization in accordance with an example embodiment. The illustrated example shows a system 100 with a first clock 102 and clock synchronization logic 106. A second clock 104 is coupled via an interface 108 to the first clock 102 and clock synchronization logic 106. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software that performs the desired functionality when executed by a processor.

In an example embodiment, the clock synchronization logic 106 determines a time difference between the first clock 102 and the second clock 104. The clock synchronization logic 106 allows the first clock 102 to synchronize with the second clock 104 when the time difference between the first clock 102 and the second clock 104 is less than a predetermined limit. The clock synchronization logic 106 prevents the first clock 102 from synchronizing with the second clock 104 when the time difference between the clock and the second clock is not less than the predetermined limit until a predefined event has been detected.

For example, a user interface (not shown, see e.g., FIG. 2) can be coupled with the clock synchronization logic 106. The predefined event can be a user authentication received from a predetermined user via the user interface. In an example embodiment, the user authentication comprises receiving user authentication data via a token. In another example embodiment, the user interface comprises a keypad, wherein the user authentication comprises receiving a predefined code via the keypad. In yet another example embodiment, the user interface comprises a touch screen, wherein the user authentication comprises receiving a predefined code via the touch screen. In particular embodiments, as will be described in more detail herein infra, the predefined event further comprises an input to from the authenticated user to enter a predefined mode. In still yet another example embodiment, the second interface may be contained inside a housing where the second interface is not accessible until the user authentication has completed. The input from the authenticated user to enter a predefined mode is received via the second interface.

In another example embodiment, the clock synchronization logic 106 determines a sum of changes to the first clock 102 over a predefined time period. If the sum of changes is less than the predefined limit, the clock synchronization logic 106 allows the first clock 102 to synchronize with the second clock 104; otherwise, the first clock 102 is not allowed to synchronize with the second clock 104. As will be described in further detail herein, the clock synchronization logic 106 may prevent the first clock 102 from synchronizing with the second clock 104 until a predefined event occurs.

In still yet another example embodiment, the clock synchronization logic 106 determines a time difference between the first clock 102 and the second clock 104. if the difference between the first clock 102 and the second clock 104 is greater than a first predetermined limit, the clock synchronization logic 106 prevents the first clock 102 from synchronizing with the second clock 104. If the difference between the first clock 102 and the second clock 104 is less than the predetermined limit, the clock synchronization logic 106 determines a sum of changes to the first clock 102 over a predefined time period. If the sum of the time changes to the first clock 102 is less than a second predefined limit, the clock synchronization logic 106 allows the first clock 102 to synchronize with the second clock 104. Otherwise, (e.g., the difference between the first clock 102 and the second clock 104 is less than the first predefined limit, but the sum of changes to the first clock 102 is greater than the second predefined limit) the first clock 102 is prevented from synchronizing with the second clock 104. As will be described in further detail herein, the clock synchronization logic 106 may prevent the first clock 102 from synchronizing with the second clock 104 until a predefined event occurs. This feature can be useful in preventing an attack where a small number of incremental changes are made to circumvent the first predetermined time limit.

Figure 2:
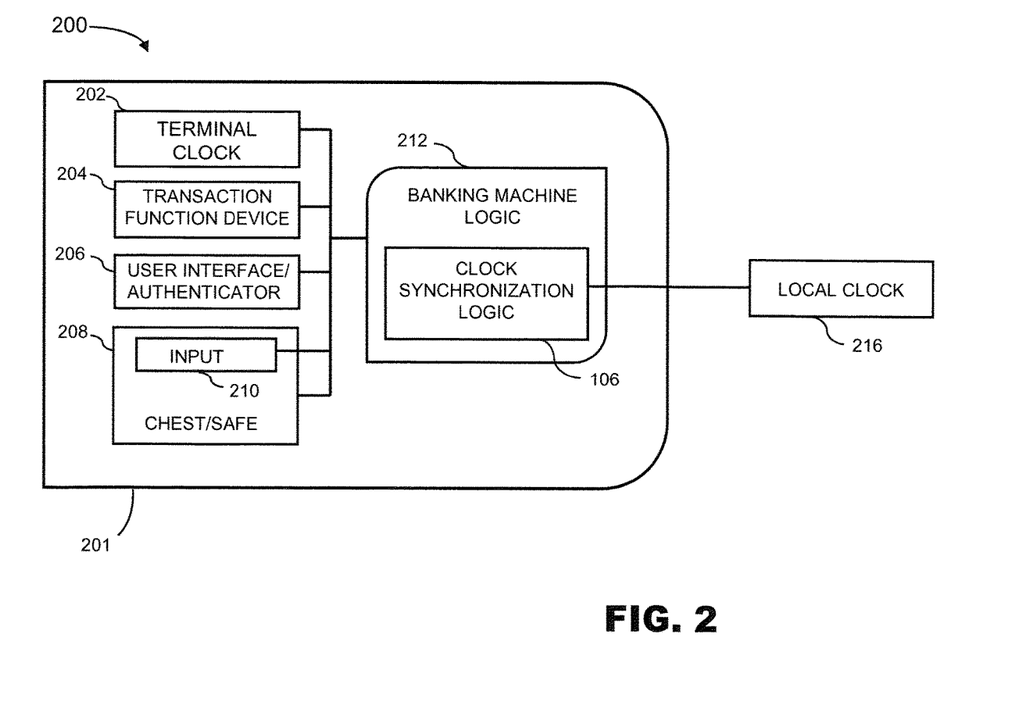
FIG. 2 is a block diagram illustrating an example of clock synchronization for an automated banking machine.

FIG. 2 is a block diagram illustrating an example of clock synchronization for an automated banking machine 200, such as an automated teller machine ("ATM"). The automated banking machine 200 comprises a housing 201 and within the housing 201 are a terminal clock 202, a transaction function device 204, a user interface/authentication device 206, a chest/safe 208, and an input associated with the chest/safe 208. The automated banking machine logic 212 further comprises banking machine logic 212 that includes clock synchronization logic 106 as described herein. A local clock 216 is coupled with the clock synchronization logic 106.

In an example embodiment, the terminal clock 202 can be used for restricting access to parts of the automated banking machine 200 during certain time periods. The transaction function device 204 can be any type of transaction function device associated with automated banking machines such as, including but not limited to, cash dispensers, check acceptors, receipt printers, cash acceptors, or cash recyclers. As those skilled in the art can readily appreciate, in particular embodiments, the automated banking machine 200 may suitably comprise a plurality of transaction function devices 204. A single transaction function device 204 is illustrated merely for ease of illustration.

The user interface 206 may also be employed for authentication of service personnel or other personnel who might access the machine. In particular embodiments, the user interface and the authentication device may be separate components.

The chest/safe 208 may be employed for storing cash and other items such as deposited items (e.g., checks or other negotiable instruments). An input device 210, which may be something as simple as a button or any suitable input device can be employed for allowing the terminal clock 202 to synchronize with the local clock 216 if the time difference between the terminal clock 202 and the local clock 216 exceeds the predetermined limit.

In an example embodiment, the clock synchronization logic 106 allows the (first) terminal clock 202 to synchronize with the (second) local clock 216 when the time difference between the terminal clock 202 and the local clock 216 is less than a predetermined limit (for example less than two hours). Any desired predefined limit can be selected. Because some locks on an automated banking machine may be time controlled, the predefined limit can be employed to indicate whether there is a possibility that the terminal clock 202 has been tampered with, which could allow access to areas of the automated banking machine 200 during restricted time periods. Thus, the clock synchronization logic 106 can prevent the clocks from synchronizing until an authorized person is physically present at the automated banking machine 200 who can inspect the automated banking machine 200 for signs of tampering. Thus, the clock synchronization logic 106 prevents the terminal clock 202 from synchronizing with the local clock 216 when the time difference between the clock and the second clock is not less than the predetermined limit until a predefined event has been detected. In an example embodiment, the clock synchronization logic 106 prevents the terminal clock 202 from synchronizing with the local clock 216 if the sum of time changes over a predefined period of time exceeds a specified time limit.

In an example embodiment, user authentication is received via the user interface 206. For example, the user authentication may comprise receiving user authentication data via a token. As another example, the user interface 206 may comprise a keypad, wherein the user authentication comprises receiving a predefined code via the keypad. As yet another example, user interface 206 may comprise a touch screen, wherein the user authentication comprises receiving a predefined code via the touch screen.

In an example embodiment, after the user has authenticated via the user interface/authentication device 206, the user may gain access into the housing 201. In particular embodiments, after being authenticated the user may gain access into the chest/safe 208. The user may then employ input device 210 to enter a predefined mode (for example a service mode) that will allow the terminal clock 202 to synchronize with the local clock 216 after the difference between the terminal clock 202 and the local clock 216 exceeds the predetermined limit.

Figure 3:
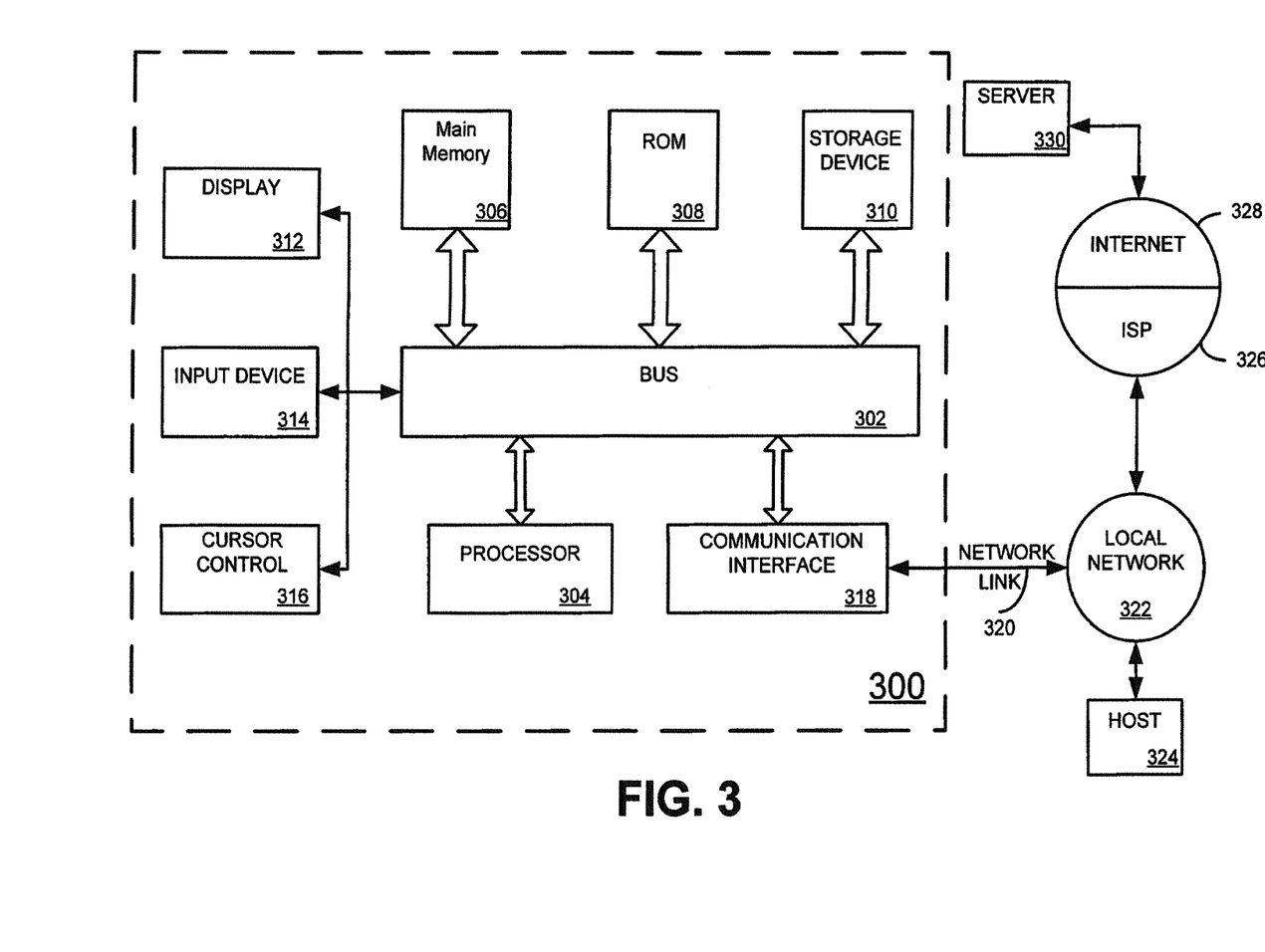
FIG. 3 is a block diagram that illustrates a computer system upon which an example embodiment may be implemented.

FIG. 3 is a block diagram that illustrates a computer system 300 upon which an example embodiment may be implemented. For example, computer system 300 may be employed to implement the clock synchronization logic 106 described in FIGS. 1 and 2.

Computer system 300 includes a bus 302 or other communication mechanism for communicating information and a processor 304 coupled with bus 302 for processing information. Computer system 300 also includes a main memory 306, such as random access memory (RAM) or other dynamic storage device coupled to bus 302 for storing information and instructions to be executed by processor 304. Main memory 306 also may be used for storing a temporary variable or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

In an example embodiment, computer system 300 may be coupled via bus 302 to a display 312 such as a cathode ray tube (CRT) or liquid crystal display (LCD), for displaying information to a computer user. An input device 314, such as a keyboard including alphanumeric and other keys is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g. x) and a second axis (e.g. y) that allows the device to specify positions in a plane.

An aspect of the example embodiment is related to the use of computer system 300 for clock synchronization. According to an example embodiment, clock synchronization is provided by computer system 300 in response to processor 304 executing one or more sequences of one or more instructions contained in main memory 306. Such instructions may be read into main memory 306 from another computer-readable medium, such as storage device 310. Execution of the sequence of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 304 for execution. Such a medium may take many forms, including but not limited to non-volatile media, volatile media, and transmission media. Non-volatile media include for example optical or magnetic disks, such as storage device 310. Volatile media include dynamic memory such as main memory 306. Transmission media include coaxial cables, copper wire and fiber optics, including the wires that comprise bus 302. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 304 for execution. For example, the instructions may initially be borne on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306 from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling computer system 300 to a network link 320 that is connected to a local network 322. For example, communication interface 318 may be a local area network (LAN) card to provide a data communication connection to a compatible LAN. As another example, communication interface 318 may be an integrated services digital network (ISDN) card or a modem to provide a data communication connection to a corresponding type of telephone line. Wireless links may also be implemented. In any such implementation, communication interface 318 sends and receives electrical, electromagnetic, or optical signals that carry digital data streams representing various types of information. Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communications through the worldwide packet data communication network, now commonly referred to as the "Internet" 328. This can allow processor 304 to perform clock synchronization with a clock associated with host 324 or server 330 as desired.

Figure 4:
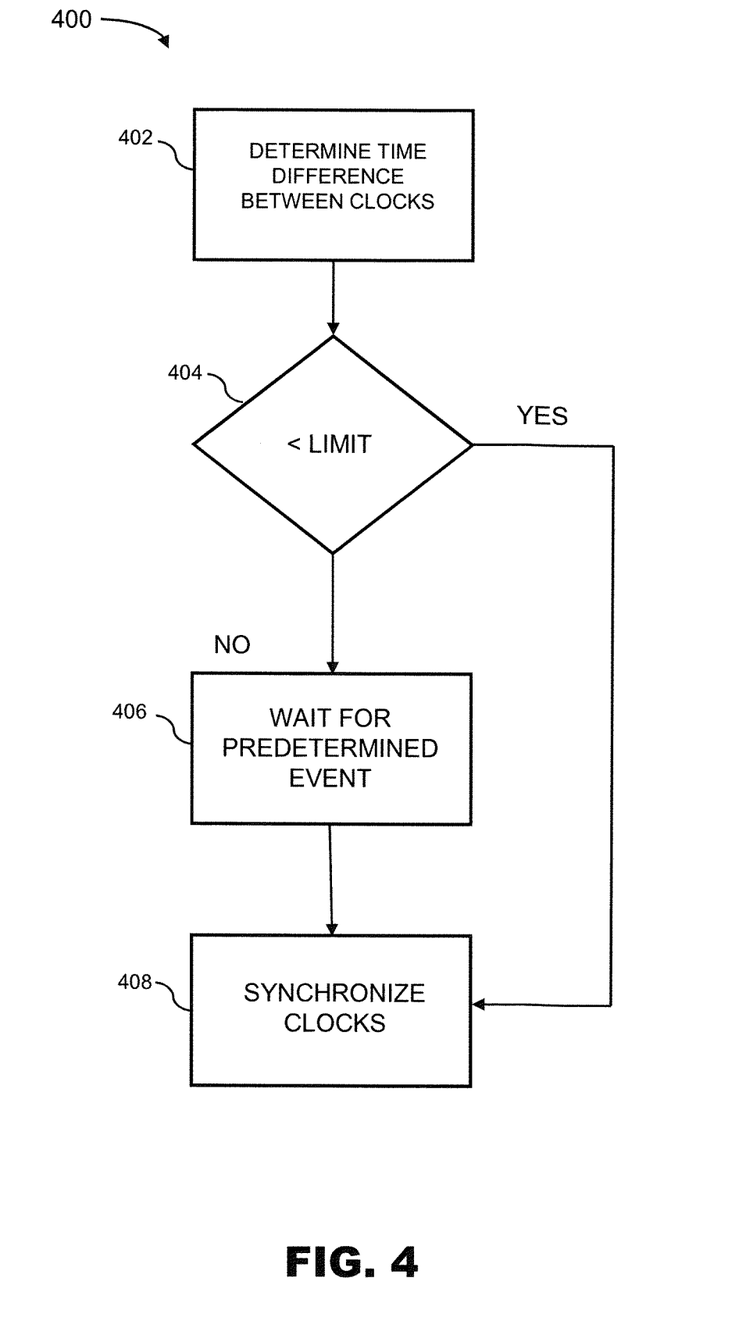
FIG. 4 illustrates a methodology that allows clock synchronization when the adjustment is less than a predefined threshold.
Figure 5:
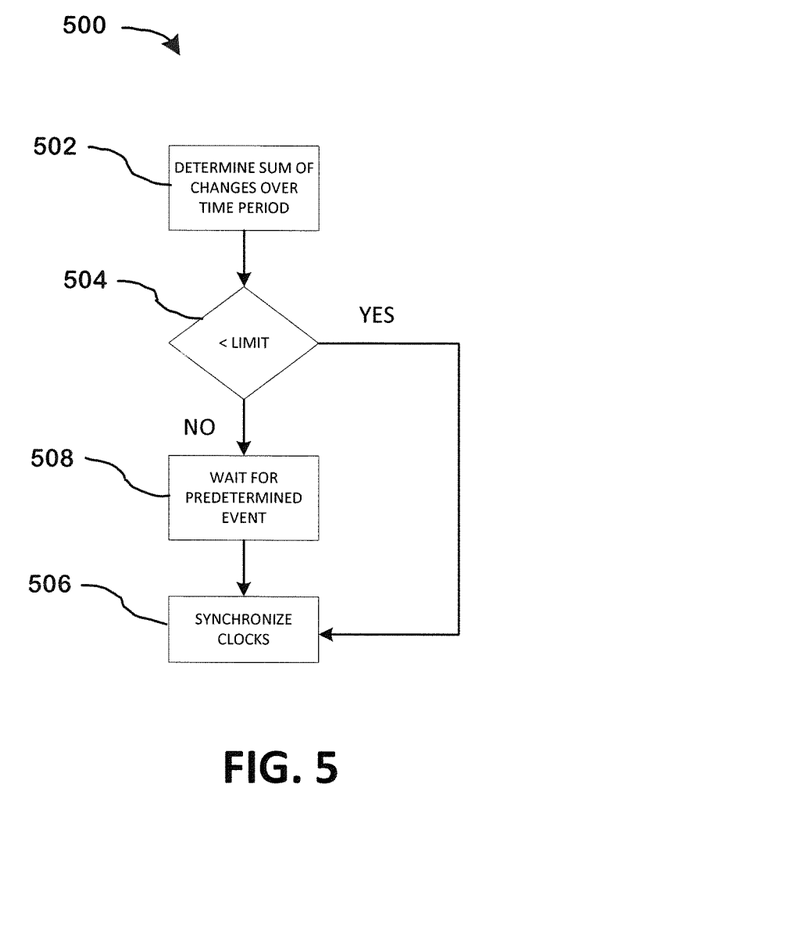
FIG. 5 illustrates a methodology that allows clock synchronization if the sum of clock changes over a predefined time period is less than a predefined limit.
Figure 6:
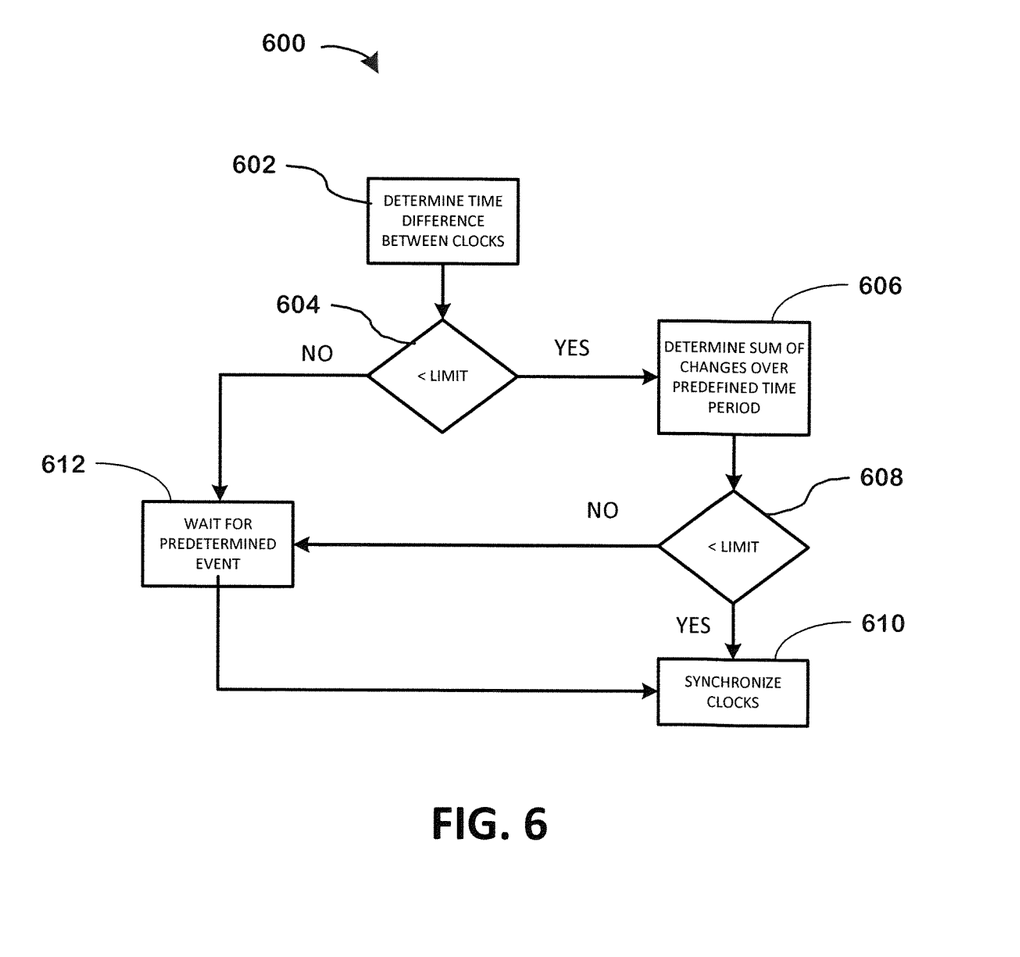
FIG. 6 illustrates a methodology that allows clock synchronization if the adjust is less than a predefined threshold and if the adjustment is less than a predetermined limit and if the sum of clock changes over a predefined time period is less than a predefined limit.

In view of the foregoing structural and functional features described above, a methodologies 400, 500, 600 in accordance with an example embodiments will be better appreciated with reference to FIGS. 4-6 respectively. While, for purposes of simplicity of explanation, the methodologies 400, 500, 600 of FIGS. 4-6 respectively are shown and described as executing serially, it is to be understood and appreciated that the example embodiments are not limited by the illustrated order, as some aspects could occur in different orders and/or concurrently with other aspects from that shown and described herein. Moreover, not all illustrated features may be required. The methodologies described herein is suitably adapted to be implemented in hardware, software when executed by a processor, or a combination thereof. For example, the methodologies 400, 500, 600 may be implemented by clock synchronization logic 106 described in FIGS. 1 and 2 or processor 304 described in FIG. 3.

FIG. 4 illustrates a methodology that allows clock synchronization when the adjustment is less than a predefined threshold. At 402, a difference between the two time clocks that are to be synchronized is determined. At 404, a determination is made whether the difference between the two time clocks exceeds a predetermined limit (or threshold). The limit may be any desired time period (e.g., 1 hour, 2 hours, etc.). This feature can be useful in detecting whether tampering is occurring in order to gain access to certain areas where access is based on the time of day.

If at 404, the difference between the clocks is less than the predetermined limit (YES), the clocks may synchronize as indicated by 408. If, however, at 404, the difference between the clocks is greater than the predetermined limit (NO), at 406, the methodology 400 waits for a predetermined event (which in certain embodiments may include a plurality of events). For example, the events may include a login by predefined persons (such as security, supervisory or service personnel). In particular embodiments, the waiting for the predetermined event at 406 further includes waiting for the authorized user to perform a task (such as entering a predefined mode, such as a service or supervisory mode).

FIG. 5 illustrates a methodology 500 for performing clock synchronization that allows clock synchronization if the sum of clock changes over a predefined time period is less than a predefined limit. At 502, the sum of changes over a predefined time period are determined. The predefined time period may be any desired time period, e.g., hour, day, week, etc. At 504, a determination is made whether the sum of the changes over the time period exceed a predefined limit or threshold. This feature can be employed to detect an attack that employs multiple, small changes in order to gain access to certain areas where access is based on the time of day.

If, at 504, the sum of changes over the predefined period is less than the limit (YES), the clocks are allowed to synchronize as indicated by 506. However, if at 504, the determination is made that the changes over the predefined time period exceed the predefined limit (NO), the clocks are not allowed to synchronize until a predefined event occurs. For example, the predefined event may comprise a user authentication that is received from a predetermined user (e.g., authorized service person) via the user interface. The user interface may be any suitable user interface such as a display and keypad, and optionally a card reader, or a wireless interface that can receive authentication data wirelessly. In an example embodiment, authentication may comprise receiving user authentication data via a token via the user interface. In particular embodiments, the user authentication comprises receiving a predefined code via a keypad. In yet another example embodiment, the user authentication comprises receiving a predefined code via a touch screen. In still yet another example embodiment, the predefined event comprises an input to from an authenticated user to enter a predefined mode. The input may be to enter a predefined mode after the user authentication has completed.

FIG. 6 illustrates a methodology 600 that allows clock synchronization if the adjustment is less than a first predefined limit and the sum of clock changes over a predefined time period is less than a second predefined limit. The first and second predefined limits may be the same or they may be different from each other. At 602, a difference between the two time clocks that are to be synchronized is determined. At 604, a determination is made whether the difference between the two time clocks exceeds a first predetermined limit. The first predefined limit may be any desired time period (e.g., 1 hour, 2 hours, etc.).

If at 604, the difference between the clocks is greater than the first predetermined limit (NO), at 606, in an example embodiment the methodology 600 does not perform any other checks since a problem has already been detected. At 612, the methodology 600 pauses and waits for a predetermined event (which in certain embodiments may include a plurality of events). For example, the events may include a login by predefined persons (such as security, supervisory or service personnel). In particular embodiments, the waiting for the predetermined event at 406 further includes waiting for the authorized user to perform a task (such as entering a predefined mode, such as a service or supervisory mode).

However, If, at 604, the difference between the clocks is less than the predetermined limit (YES), at 606, the sum of changes over a predefined time period are determined. The predefined time period may be any desired time period, e.g., hour, day, week, etc. At 608, a determination is made whether the sum of the changes over the time period exceed a second predefined limit or threshold.

If, at 608, the sum of changes over the predefined period is less than the second predefined limit (YES), the clocks are allowed to synchronize as indicated by 610. However, if at 608, the determination is made that the changes over the predefined time period exceed the second predefined limit (NO), the clocks are not allowed to synchronize until a predefined event occurs as indicated at 612 described herein supra.

Described above are example embodiments. It is, of course, not possible to describe every conceivable combination of components or methodologies for purposes of describing the example embodiments, but one of ordinary skill in the art will recognize that many further combinations and permutations of the example embodiments are possible. Accordingly, it is intended to embrace all such alterations, modifications and variations that fall within the spirit and scope of any claims filed in applications claiming priority hereto interpreted in accordance with the breadth to which they are fairly, legally and equitably entitled.

The invention claimed is:

1. A method, comprising:
   determining a time difference between the first clock and the second clock; and
   preventing the first clock from synchronizing with the second clock responsive to the time difference between the first clock and the second clock is greater than a predetermined limit until a predefined event has been detected;
   wherein the predefined event comprises:
      receiving a user authentication from a predetermined user via a first user interface,
      providing access to a second interface that is inside a housing responsive to the predefined user authenticating via the first user interface,
      receiving an input via the second user interface to enter a predefined mode that allows synchronizing of the first clock with the second clock, and
      synchronizing the first clock with the second clock responsive to entering the predefined mode.

2. The method set forth in claim 1, wherein receiving the user authentication comprises receiving user authentication data via a token.

3. The method set forth in claim 1,
   wherein the user interface comprises a keypad; and
   wherein receiving the user authentication comprises receiving a predefined code via the keypad.

4. The method set forth in claim 1,
   wherein the user interface comprises a touch screen; and
   wherein receiving the user authentication comprises receiving a predefined code via the touch screen.

5. The method set forth in claim 1, further comprising:
   determining a second time difference between a first clock and a second clock at a second time;
   synchronizing the first clock with the second clock responsive to determining the second time difference between the first clock and the second clock is less than the predetermined limit.

6. A tangible, non-transitory computer readable medium with instructions encoded thereon for execution by a process and when executed operable to:
   determine a time difference between a first clock and a second clock;
   prevent the first clock from synchronizing with the second clock responsive to the time difference between the first clock and the second clock is greater than a predetermined limit;
   receive a user authentication from a predetermined user via a first user interface;

provide access to a second interface responsive to the predetermined user successfully authenticating via the first user interface;

receiving an input via the second user interface to enter a predefined mode that allows synchronizing of the first clock with the second clock; and synchronize the first clock with the second clock responsive to entering the predefined mode.

7. The tangible, non-transitory computer readable medium set forth in claim 6, wherein the instructions are operable to receive user authentication data via a token.

8. The tangible, non-transitory computer readable medium set forth in claim 6, wherein the user interface comprises a keypad; and wherein the instructions are further operable to receive a predefined code via the keypad for user authentication.

9. The tangible, non-transitory computer readable medium set forth in claim 6, the user interface comprises a touch screen; and wherein the instructions are further operable to receive a predefined code via the touch screen for user authentication.

10. The tangible, non-transitory computer readable medium set forth in claim 6, determine a second time difference between a first clock and a second clock at a second time;

synchronize the first clock with the second clock responsive to determining the second time difference between the first clock and the second clock is less than the predetermined limit.

11. An apparatus, comprising:

a first clock;

a communication interface for communicating with a second clock; and clock synchronization logic coupled with the clock and the communication interface; and a user interface coupled with the clock synchronization logic;

the clock synchronization logic is operable determine a time difference between the first clock and a second clock;

the clock synchronization logic is operable to determine a sum of changes to the first clock over a predefined time period; and the clock synchronization logic is operable to prevent the first clock from synchronizing with the second clock when the sum of changes is greater than a predetermined time limit until a predefined event has been detected.

12. The apparatus set forth in claim 11, wherein the predefined event is a user authentication received from a predetermined user via the user interface.

13. The apparatus set forth in claim 12, wherein the user authentication comprises receiving user authentication data via a token from the user interface.

14. Apparatus set forth in claim 12, wherein the user interface further comprises a keypad;

wherein the user authentication comprises receiving a predefined code via the keypad.

15. The apparatus set forth in claim 12, wherein the user interface comprises a touch screen;

wherein the user authentication comprises receiving a predefined code via a touch screen.

16. The apparatus set forth in claim 12, wherein the predefined event further comprises receiving an input via the user interface from the authenticated user to enter a predefined mode.

17. The apparatus set forth in claim 16, wherein the clock synchronization logic is operable to synchronize the first clock with the second clock responsive to the input.

18. The apparatus set forth in claim 16, further comprising:

a housing;

a second user interface inside the housing;

wherein the clock synchronization logic is operable to allow access to the inside of the housing responsive to a user successfully authenticating via the first user interface; and wherein the clock synchronization logic receives the input via the second user interface.

19. The apparatus set forth in claim 11, wherein the clock synchronization logic is operable to synchronize the first clock with the second clock responsive to determining the sum of changes is less than a predefined time limit.

20. The apparatus set forth in claim 11, wherein the clock synchronization logic is operable to determine a time difference between the first clock and the second clock; and wherein the clock synchronization logic is operable to synchronize the first clock with the second clock responsive to determining the time difference between the first clock and second clock is less than a first predefined time limit and to determining the sum of changes is less than a second predefined time limit.

* * * * *